US012774144B2

(12) United States Patent
Moore

(10) Patent No.: US 12,774,144 B2
(45) Date of Patent: Oct. 27, 2026

(54) TUB SUPPORT

(71) Applicant: Sonoco Development, Inc., Hartsville, SC (US)

(72) Inventor: Clifton T. Moore, Nashville, TN (US)

(73) Assignee: Sonoco Development, Inc., Hartsville, SC (US)

( * ) Notice: Subject to any disclaimer, the term of this patent is extended or adjusted under 35 U.S.C. 154(b) by 1 day.

(21) Appl. No.: 18/985,989

(22) Filed: Dec. 18, 2024

(65) Prior Publication Data

US 2025/0242989 A1 Jul. 31, 2025

Related U.S. Application Data

(60) Continuation of application No. 18/241,332, filed on Sep. 1, 2023, now Pat. No. 12,208,953, which is a division of application No. 18/076,594, filed on Dec. 7, 2022, now Pat. No. 11,780,663.

(60) Provisional application No. 63/410,682, filed on Sep. 28, 2022.

(51) Int. Cl.

*B65D 81/05* (2006.01)
*B31D 5/04* (2017.01)
*B65D 85/68* (2006.01)

(52) U.S. Cl.

CPC ............... *B65D 81/05* (2013.01); *B31D 5/04* (2013.01); *B65D 85/68* (2013.01); *B65D 2581/053* (2013.01); *B65D 2585/6855* (2013.01)

(58) Field of Classification Search

CPC . B65D 5/50; B65D 5/505; B65D 5/05; B65D 5/68; B65D 2581/053; B65D 2581/6855
USPC .................................................. 206/320, 592
See application file for complete search history.

(56) References Cited

U.S. PATENT DOCUMENTS

| | | | |
|---|---|---|---|
| 4,240,550 | A | 12/1980 | Collin |
| 4,832,190 | A | 5/1989 | Favreau |
| 9,540,158 | B1 | 1/2017 | Fox |
| 11,312,558 | B1 | 4/2022 | Moore |
| 11,377,296 | B2 | 7/2022 | Bischoff et al. |
| 11,524,829 | B2 | 12/2022 | Moore |

(Continued)

FOREIGN PATENT DOCUMENTS

| | | | |
|---|---|---|---|
| CA | 1301708 | A | 5/1992 |
| JP | 10101173 | A | 4/1998 |
| KR | 19990032956 | A | 5/1999 |

OTHER PUBLICATIONS

International Search Report and Written Opinion for International Application No. PCT/US2023/027377 dated Oct. 26, 2023; 14 pages.

*Primary Examiner* — Bryon P Gehman
(74) *Attorney, Agent, or Firm* — Nelson Mullins Riley & Scarborough LLP

(57) ABSTRACT

A washing machine tub lock device is provided that prevents the wash tub from impacting the washing machine cabinet during shipping and handling. The tub lock device is formed by cutting and folding a corrugated blank into an inverted truncated rectangular cone that can be wedged inside the top portion of the washing machine tub. The tub lock device includes hanging tabs which prevent the tub lock device from falling into the wash tub during shipping and handling. The tub lock device also includes elliptical tabs which bend or deform into elliptical cutouts such that the edges of the elliptical cutouts are covered, thus preventing the elliptical cutouts from damaging the washing machine during shipping and handling.

11 Claims, 18 Drawing Sheets

(56) References Cited

U.S. PATENT DOCUMENTS

| | | | |
|---|---|---|---|
| 11,780,663 | B1 | 10/2023 | Moore |
| 12,208,953 | B2 | 1/2025 | Moore |
| 2008/0168803 | A1 | 7/2008 | Muyskens |
| 2015/0337479 | A1 | 11/2015 | Senn et al. |
| 2021/0139230 | A1 | 5/2021 | Bischoff et al. |

TUB SUPPORT

CROSS-REFERENCE TO RELATED APPLICATIONS

This application is a continuation of U.S. patent application Ser. No. 18/241,332, filed Sep. 1, 2023, which is a divisional of U.S. patent application Ser. No. 18/076,594, now U.S. Pat. No. 11,780,663, filed Dec. 7, 2022, which claims benefit of U.S. Provisional Application No. 63/410,682, entitled "TUB SUPPORT," filed Sep. 28, 2022, which are all incorporated herein in their entirety.

FIELD OF THE INVENTION

Embodiments of the present invention relate generally to appliance protective packaging, and more particularly, to a protective packaging device that fits inside a washing machine tub to lock the tub in place during shipping.

BACKGROUND OF THE INVENTION

Top-loading washing machines generally comprise a spin or wash tub disposed within a washing machine cabinet or housing. Some washing machines have a central pivoting agitator extending upwardly from the bottom of the wash tub and operably connected to a motor located below the tub. Other washing machines lack this central agitator and instead ridges located on the inside of the wash tub to assist with the agitating function. In washing machines without the central agitator, the base of the wash tub itself may oscillate up and down and/or rotate back and forth to agitate the clothes. In either type of washing machine, the wash tub/system is mounted to the cabinet by suspension rods secured to the tub and the underside of the inner cabinet. This mounting design allows the tub to move freely during a wash cycle. Clearance between the wash tub and the appliance cabinet is small, and so the cabinet is susceptible to damage from impacts from the wash tub when the appliance is moved during shipping.

While certain braces exist which can be disposed within the washing machine cabinet and tub during transportation and installation, these braces tend to become dislodged during transit, falling into the tub and thereby failing to serve their intended protective purposes. This dislodging of the brace may occur due to impacts during transportation (i.e., truck impacts a pothole), due to standard vibrations during ground transportation, due to humidity or temperature changes (i.e., high humidity softens the corrugated cardboard and allows greater movement thereof), other environmental factors, or combinations thereof. Further, existing braces, if they are successfully maintained in position during transportation and installation, tend to scratch and damage the inner rim of the washing machine. Through ingenuity and hard work, the inventor hereof has developed a tub lock device which overcomes these disadvantages.

BRIEF SUMMARY OF THE INVENTION

The present invention is a tub lock device for a washing machine that secures or locks the wash tub into place to prevent the tub from impacting the cabinet during shipping and handling. In some embodiments, the tub lock device comprises four side panels arranged to form a four-sided truncated cone having a bottom major (maximum) dimension which is less than the top diameter of the wash tub and a top major (maximum) dimension exceeding the top diameter of the wash tub. In an embodiment, the tub lock device comprises hanging tabs arranged to prevent the tub lock device from falling into the wash tub during shipping and handling. Further, the tub lock device comprises elliptical tabs and elliptical cutouts such that the elliptical tabs bend or deform into the elliptical cutouts and protect the washing machine from contacting the raw edges of the elliptical cutouts during shipping and handling. In some embodiments, the tub lock device is formed from a cut and folded blank made from corrugated fiberboard. Upon delivery, the tub lock device can be removed from the appliance in a single piece and recycled.

A first embodiment of the present invention comprises a tub lock device for a washing machine. The tub lock device comprises a base and first and second side walls each extending in an upward direction from the base. The first and second side walls each define at least one elliptical tab extending outwardly from the first side wall, at least one elliptical tab extending outwardly from the second side wall, and at least one receiving slot. The tub lock device also comprises third and fourth side walls each extending in the upward direction from the base, the third and fourth walls each defining at least one elliptical cutout, at least one hanging tab extending outwardly from the third side wall, and at least one hanging tab extending outwardly from the fourth side wall. The hanging tabs are positioned upwardly from the elliptical tabs, the elliptical cutouts are configured to receive the elliptical tabs, and each of the at least one hanging tabs is received by one of the at least one receiving slots.

In some further embodiments, the tub lock device is configured to be able to interlock with a wash machine having a wash tub and a cabinet, wherein each of the at least one hanging tab and a face of each of the at least one elliptical tab are in contact with the cabinet when the tub lock device is interlocked with the wash machine.

In some further embodiments, each of the at least one elliptical tabs is positioned within one of the at least one elliptical cutouts.

In some further embodiments, the tub lock device comprises corrugated fiberboard.

In some further embodiments, the third and fourth side walls each also defines at least one positive stop between the at least one elliptical cutout and the at least one hanging tab, and the positive stops rest against the first and second side walls.

In some further embodiments, the first and second side walls each also defines at least one flap.

A second embodiment of the present invention comprises a blank for a tub lock device for a washing machine. The blank comprises a base portion, the base portion defining at least four fold lines, and at least four folding portions. Each folding portion extends outwardly from a fold line of the base portion, and the at least four folding portions each define two side edges and an outer edge. A first two of the at least four folding portions are opposite each other, with respect to the base portion, and each side edge of the first two folding portions defines an elliptical cutout and a hanging tab. A second two of the at least four folding portions are opposite each other, with respect to the base portion, and each outer edge of the second two folding portions defines two receiving slots. The second two folding portions each define two elliptical tabs.

In some further embodiments, the elliptical tabs comprise score lines within the second two folding portions.

In some further embodiments, the receiving slots are V-shaped.

In some further embodiments, the hanging tabs are disposed between the outer edge and a side edge of a first folding portion.

In some further embodiments, the panel is foldable along the at least four fold lines of the base portion.

In some further embodiments, each of the second two folding portions comprises a flap which is attachable to one of the first two folding portions adjacent to it.

In some further embodiments, the flaps are configured to bend along a flap fold line.

In some further embodiments, the elliptical tabs are positioned along the flap fold line.

In some further embodiments, each hanging tab is receivable by the receiving slot that is nearest to it.

In some further embodiments, the elliptical tabs are configured to be received by the elliptical cutouts.

In some further embodiments, each of the elliptical cutouts comprises a partial ellipsis.

In some further embodiments, the length of each of the first two folding portions is longer at the position of the hanging tabs than at the fold line of the adjacent base portion.

In some further embodiments, the elliptical tabs are aligned with and offset from the receiving slot.

A third embodiment of the present invention comprises a method of making a tub lock device for a washing machine. The method first comprises scoring a blank. The blank defines a base portion, the base portion defining at least four fold lines, and at least four folding portions, each folding portion extending outwardly from a fold line of the base portion. The at least four folding portions each define two side edges and an outer edge. A first two of the at least four folding portions are opposite each other, with respect to the base portion, and each side edge of the first two folding portions defines an elliptical cutout and a hanging tab. A second two of the at least four folding portions are opposite each other, with respect to the base portion, and each outer edge of the second two folding portions defines two receiving slots. Each of the second two folding portions defines two flaps which are bendable along flap fold lines, and the second two folding portions each define two elliptical tabs. The method then comprises folding the first two folding portions in an inward direction, folding the second two folding portions in the inward direction, causing the first two folding portions to be received by the receiving slots, bending the flaps along the flap fold lines, and attaching the flaps to the first two folding portions. In some further embodiments, the blank comprises corrugated cardboard.

BRIEF DESCRIPTION OF THE DRAWINGS

Figure 1:
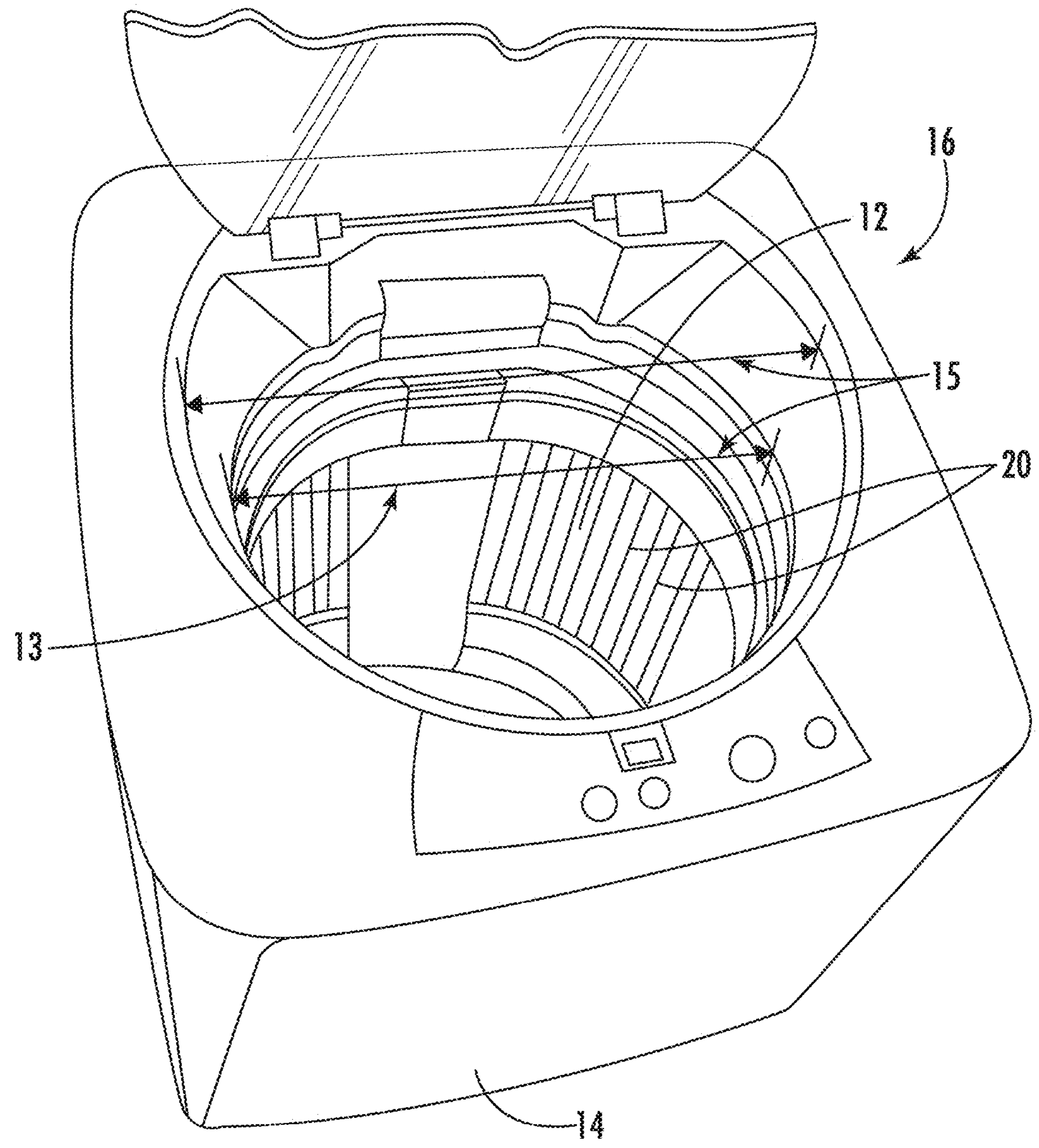

Having thus described the invention in general terms, reference will now be made to the accompanying drawings, which are not necessarily drawn to scale, and wherein:

FIG. 1 is a top perspective view of a washing machine shown without a tub lock.

Figure 2A:
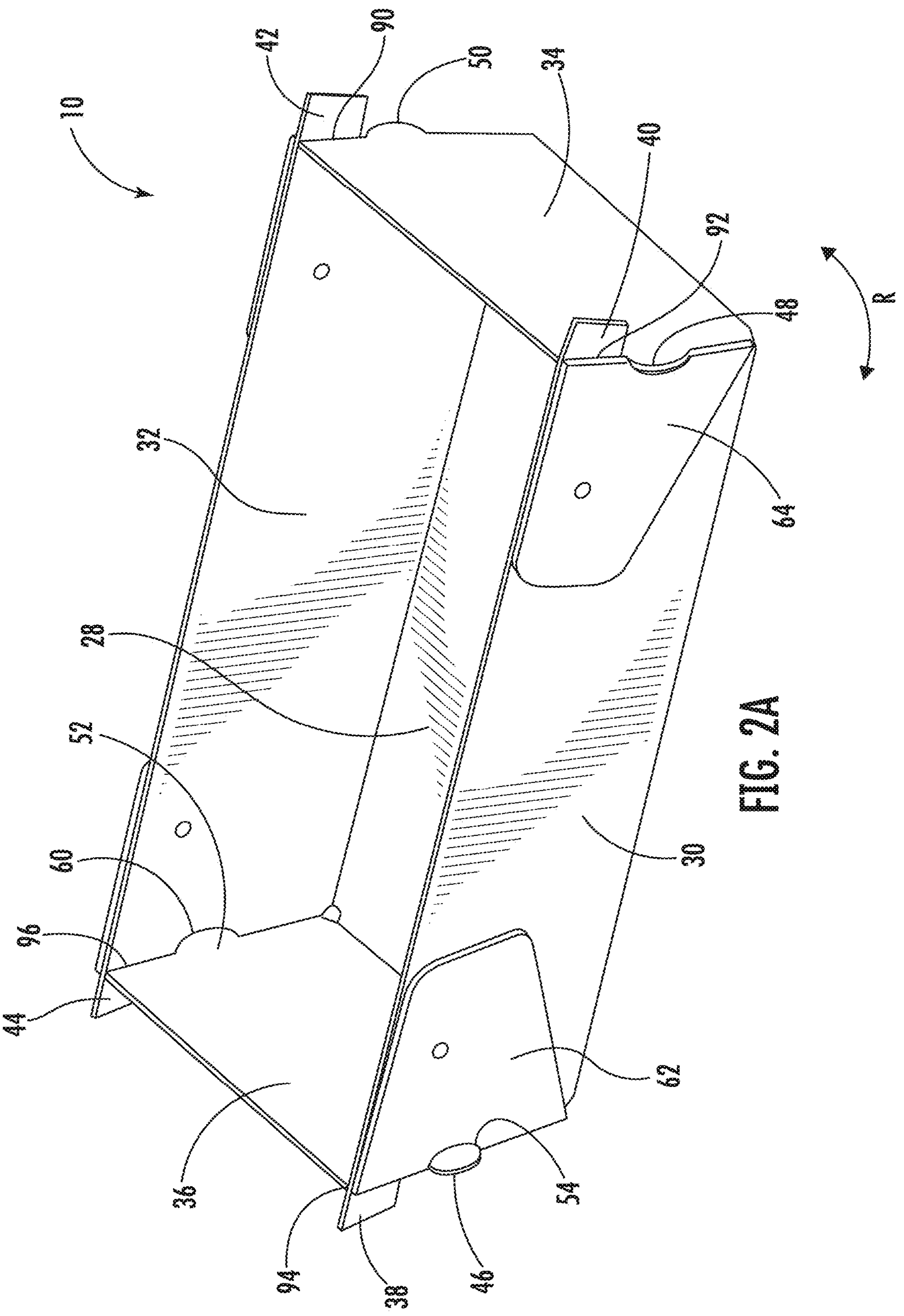

FIG. 2A is a top perspective view of a tub lock.

Figure 2B:
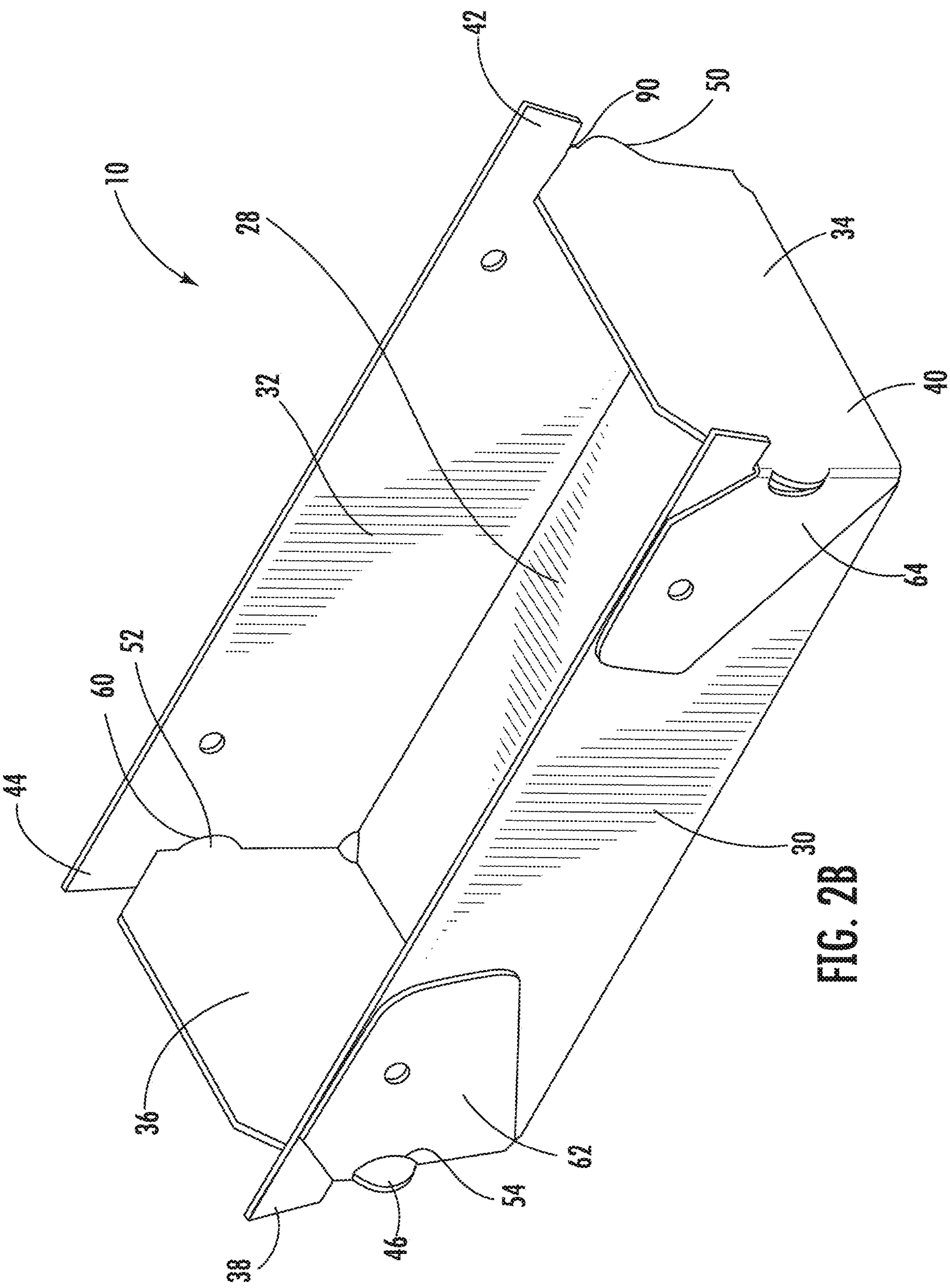

FIG. 2B is a top perspective view of an alternate embodiment of a tub lock.

Figure 2C:
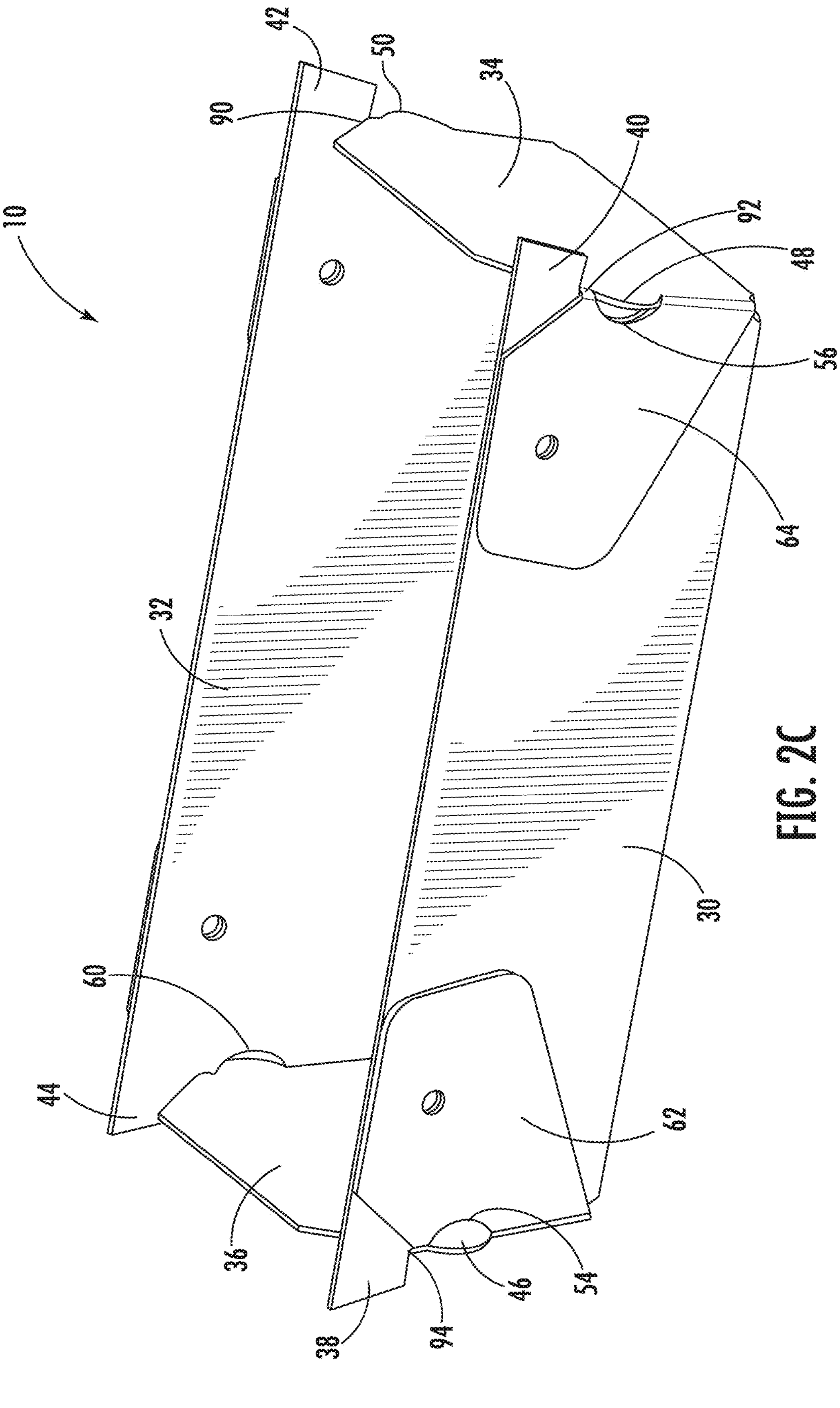

FIG. 2C is a top perspective view of a tub lock.

Figure 3A:
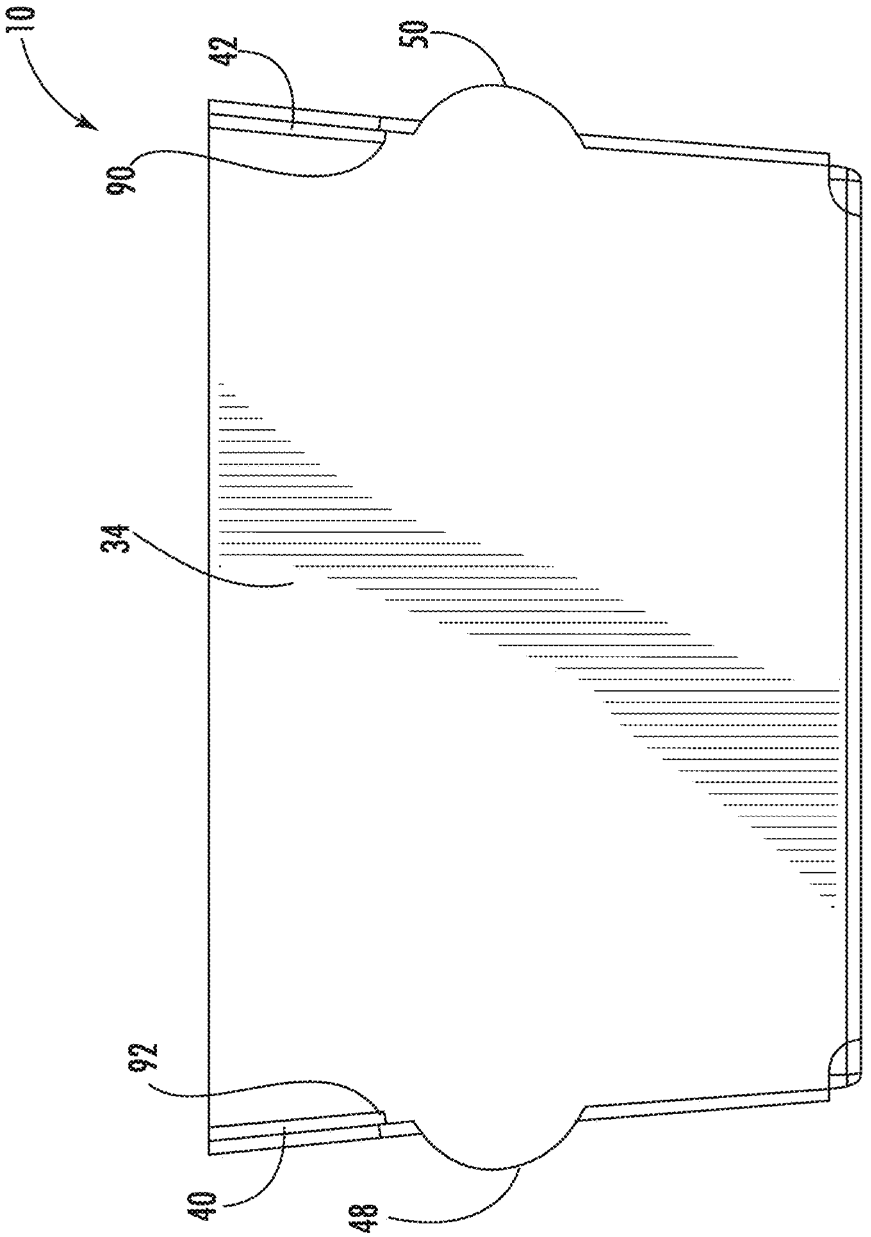

FIG. 3A is a side view of a tub lock.

Figure 3B:
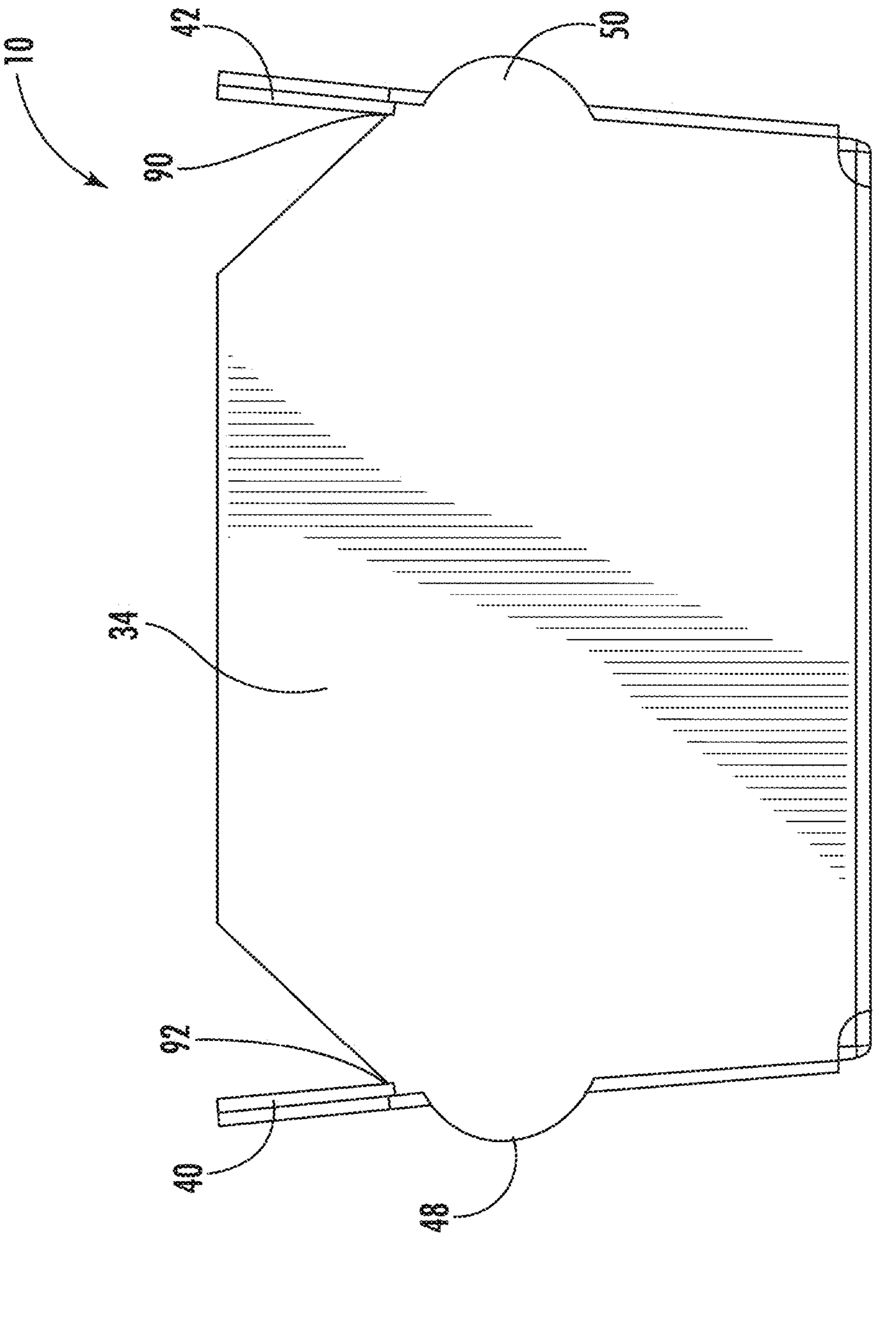

FIG. 3B is a side view of an alternate embodiment of a tub lock.

Figure 4A:
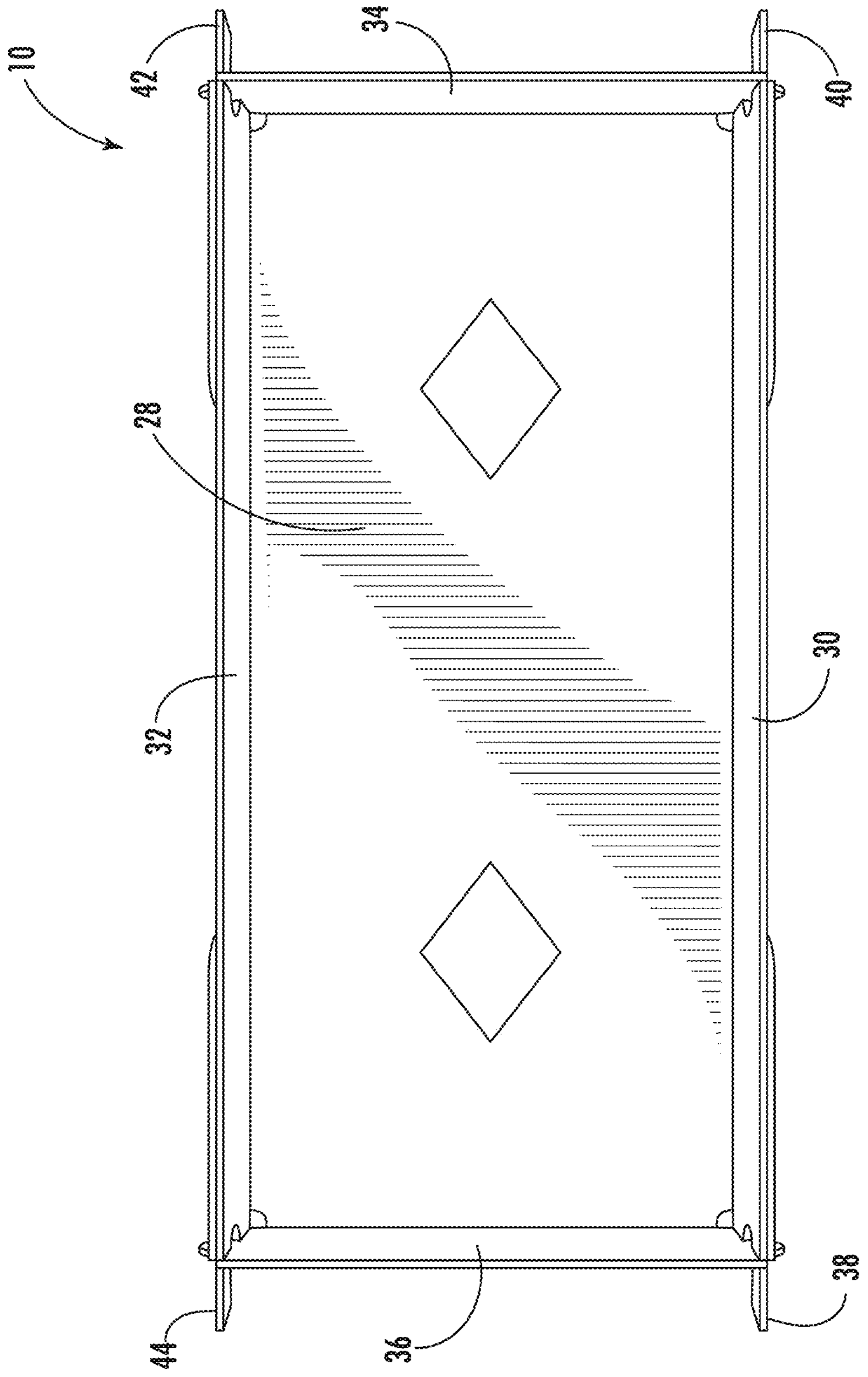

FIG. 4A is a top view of a tub lock.

Figure 4B:
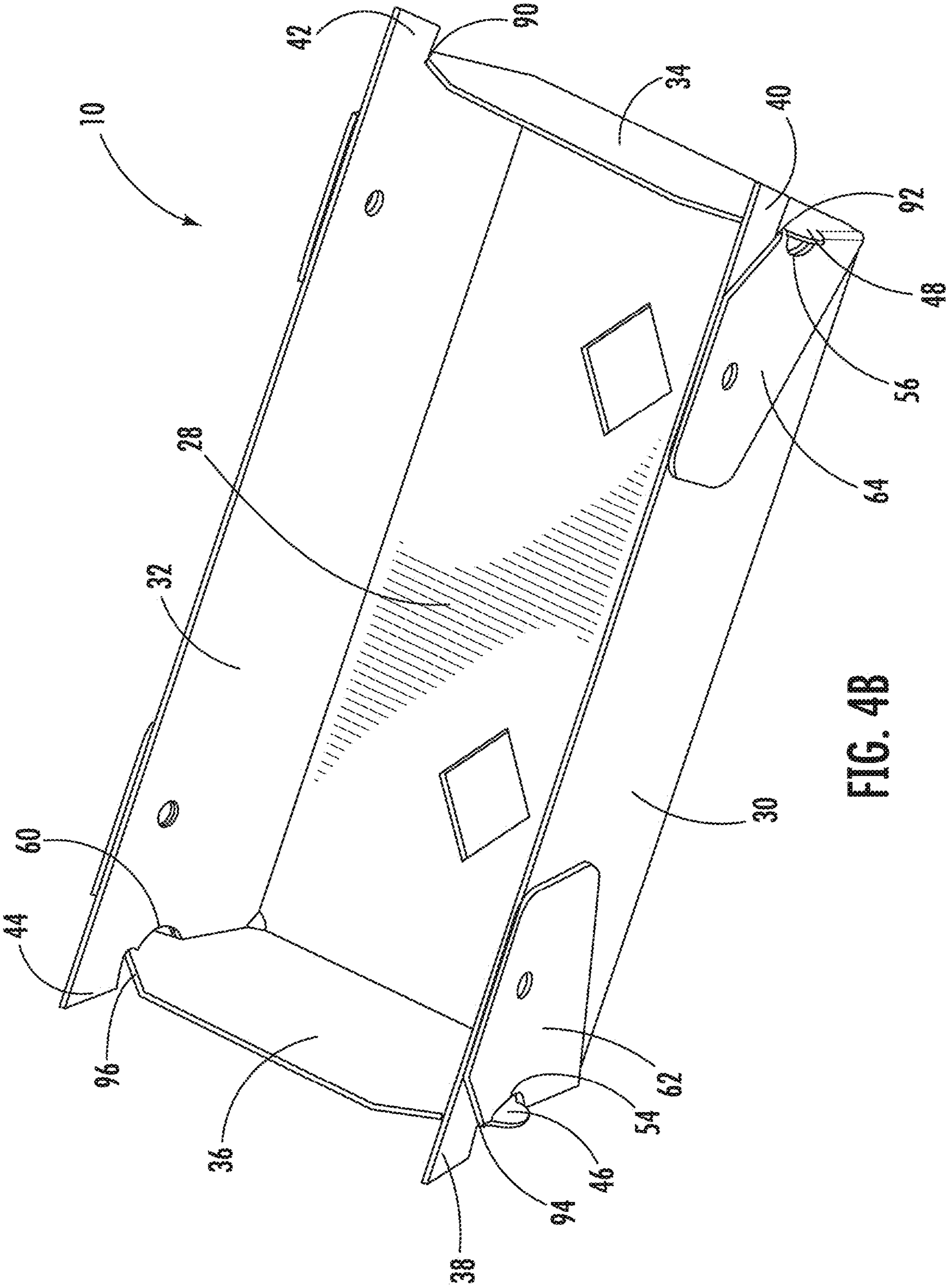

FIG. 4B is a perspective view of a tub lock.

Figure 5:
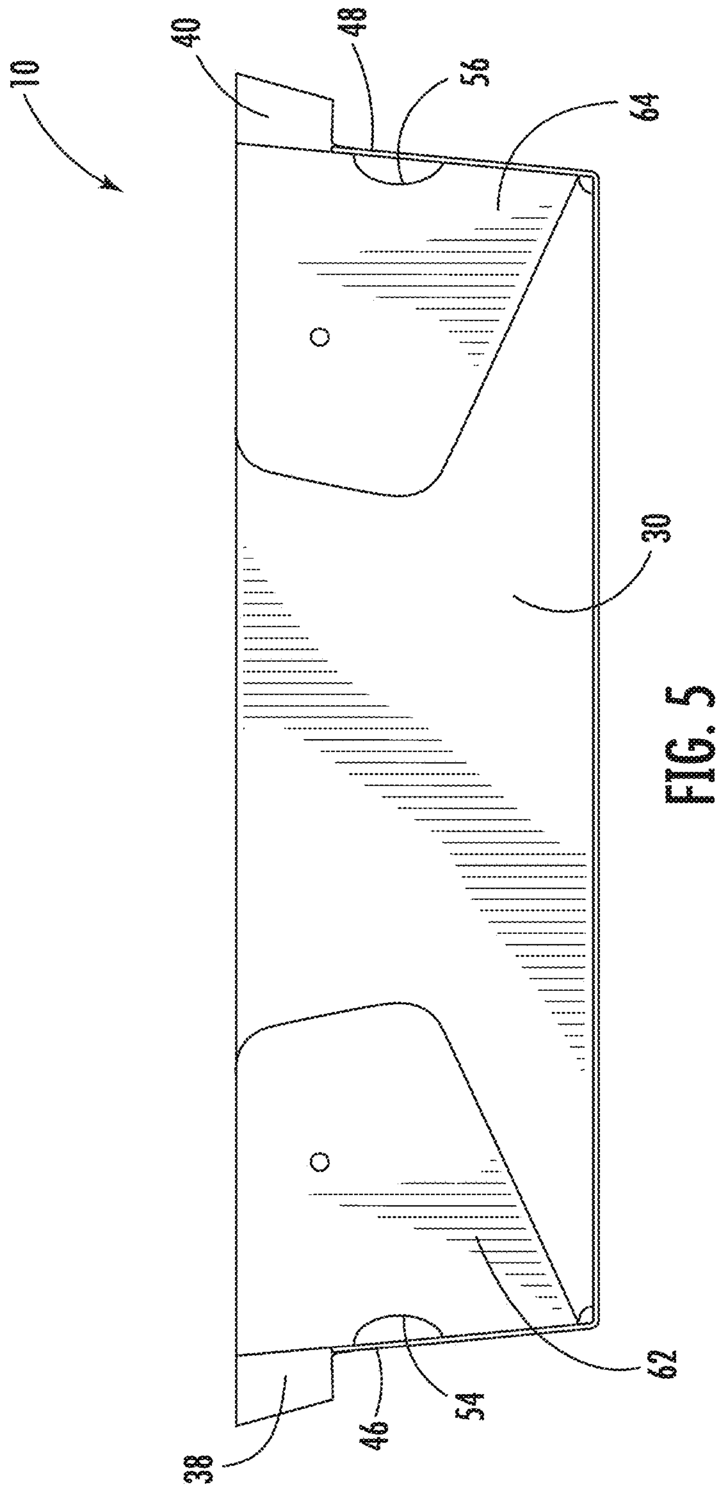

FIG. 5 is a front view of a tub lock.

Figure 6:
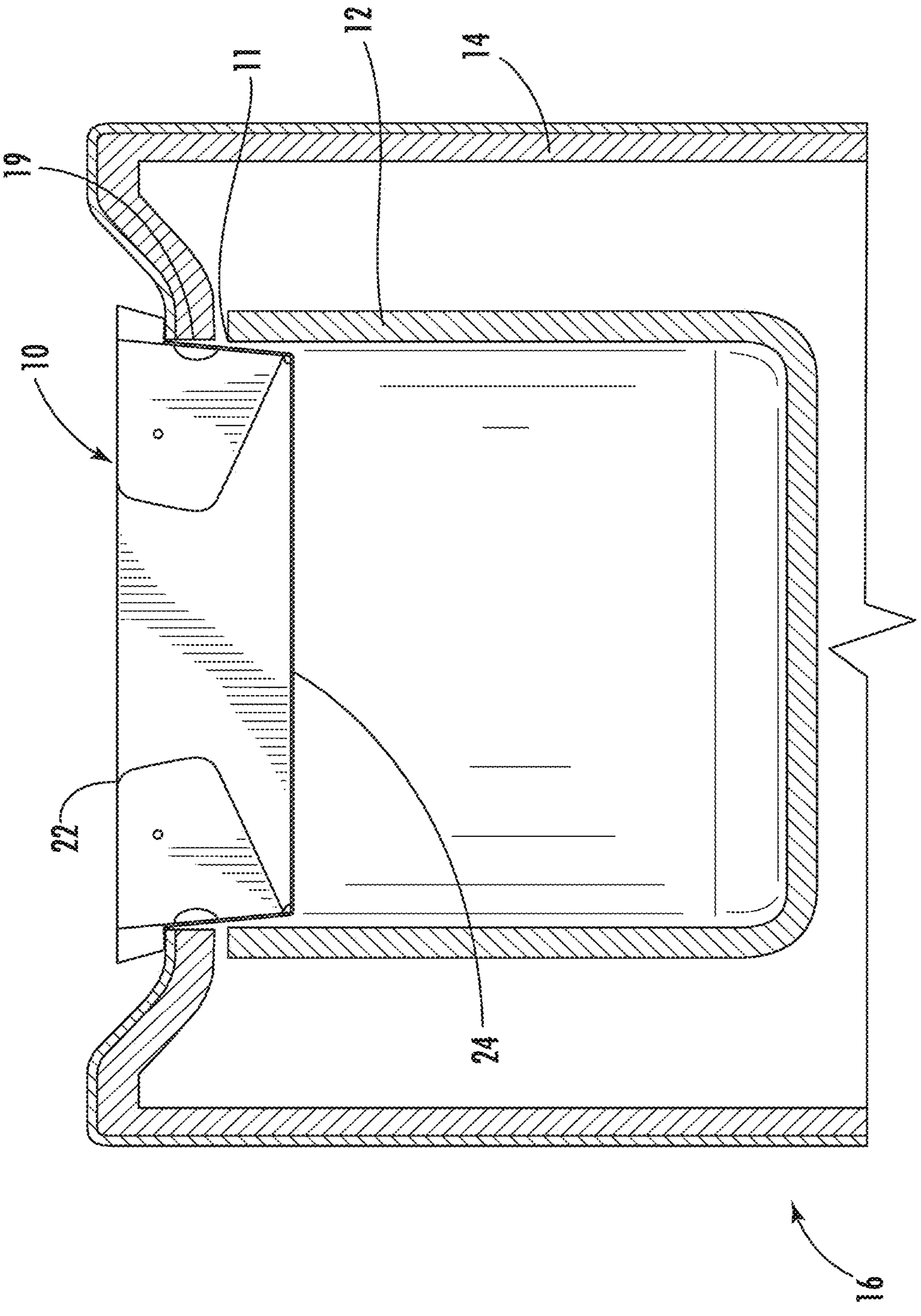

FIG. 6 is a cutaway side view of a tub lock shown installed in a washing machine.

Figure 7:
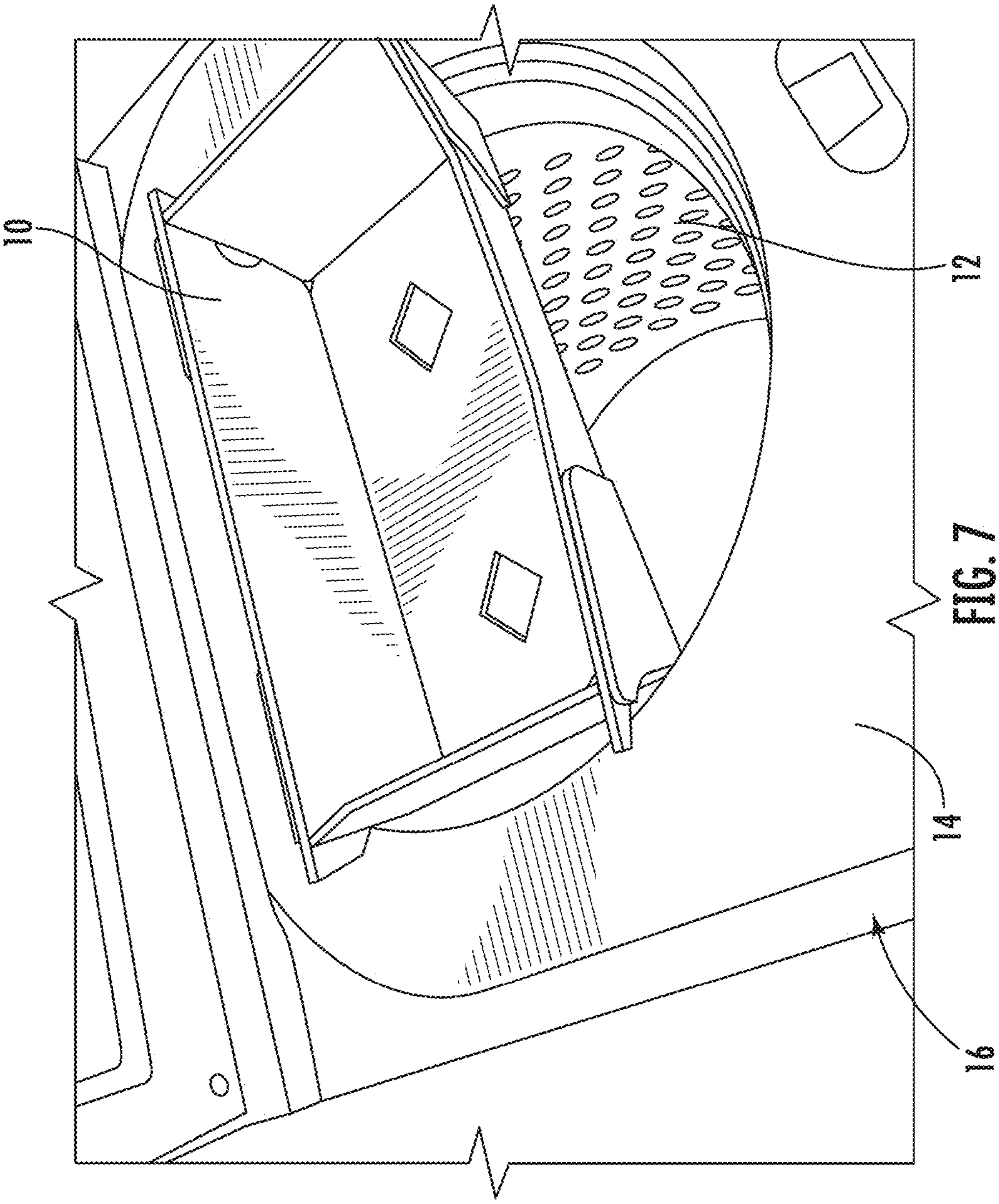

FIG. 7 is a top perspective view of a washing machine shown with a tub lock.

Figure 8:
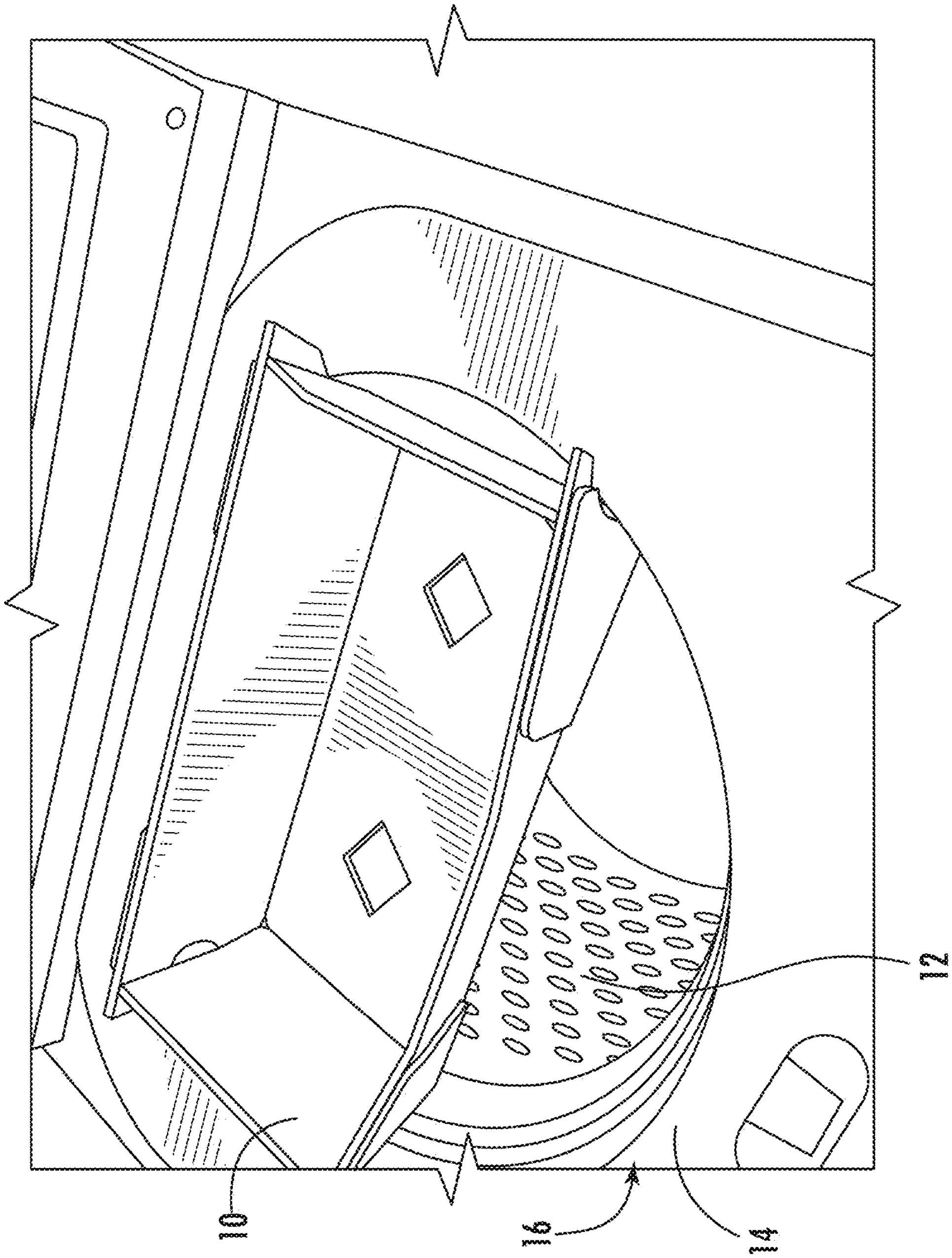

FIG. 8 is a top perspective view of a washing machine shown with a tub lock.

Figure 9:
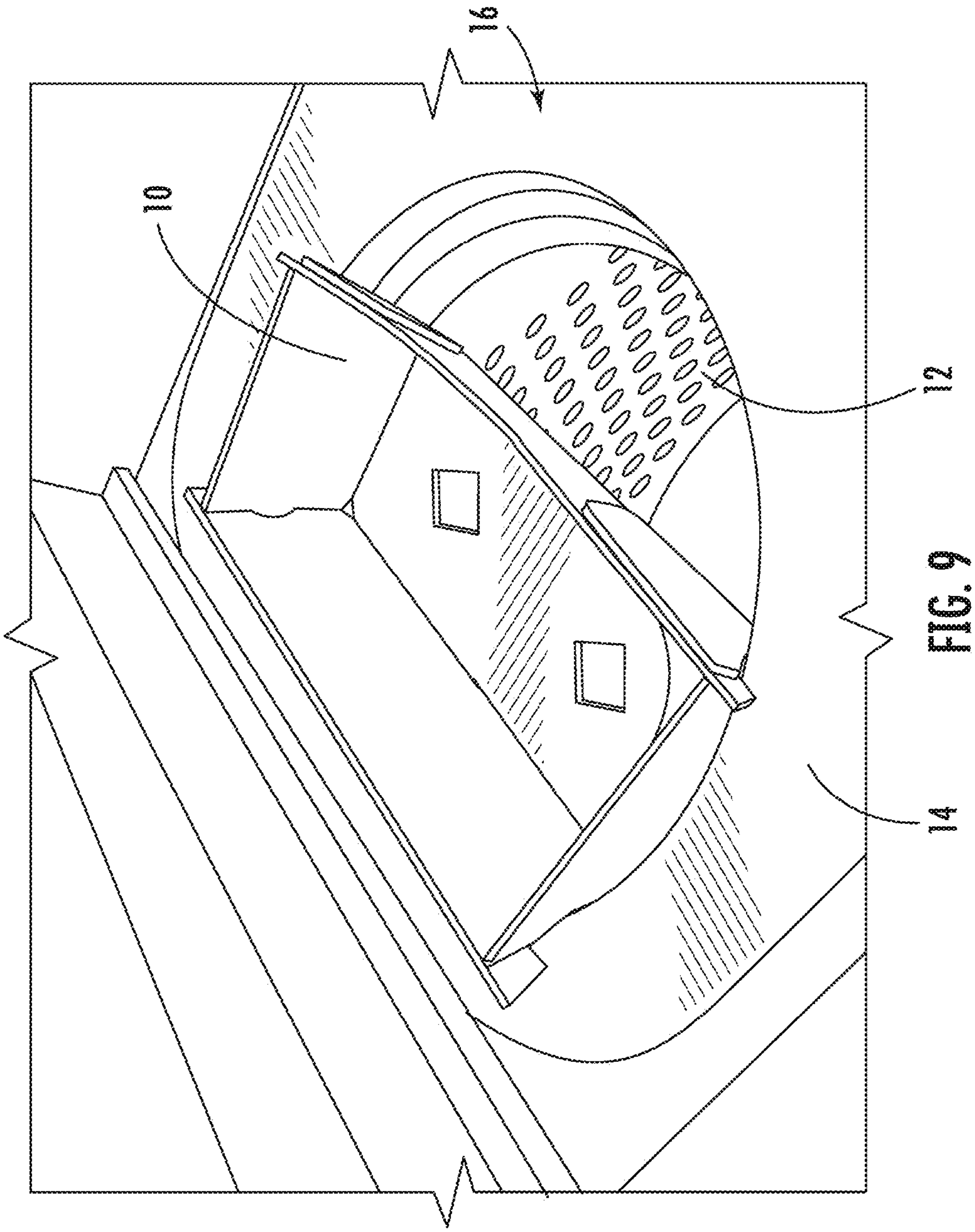

FIG. 9 is a top perspective view of a washing machine shown with a tub lock.

Figure 10:
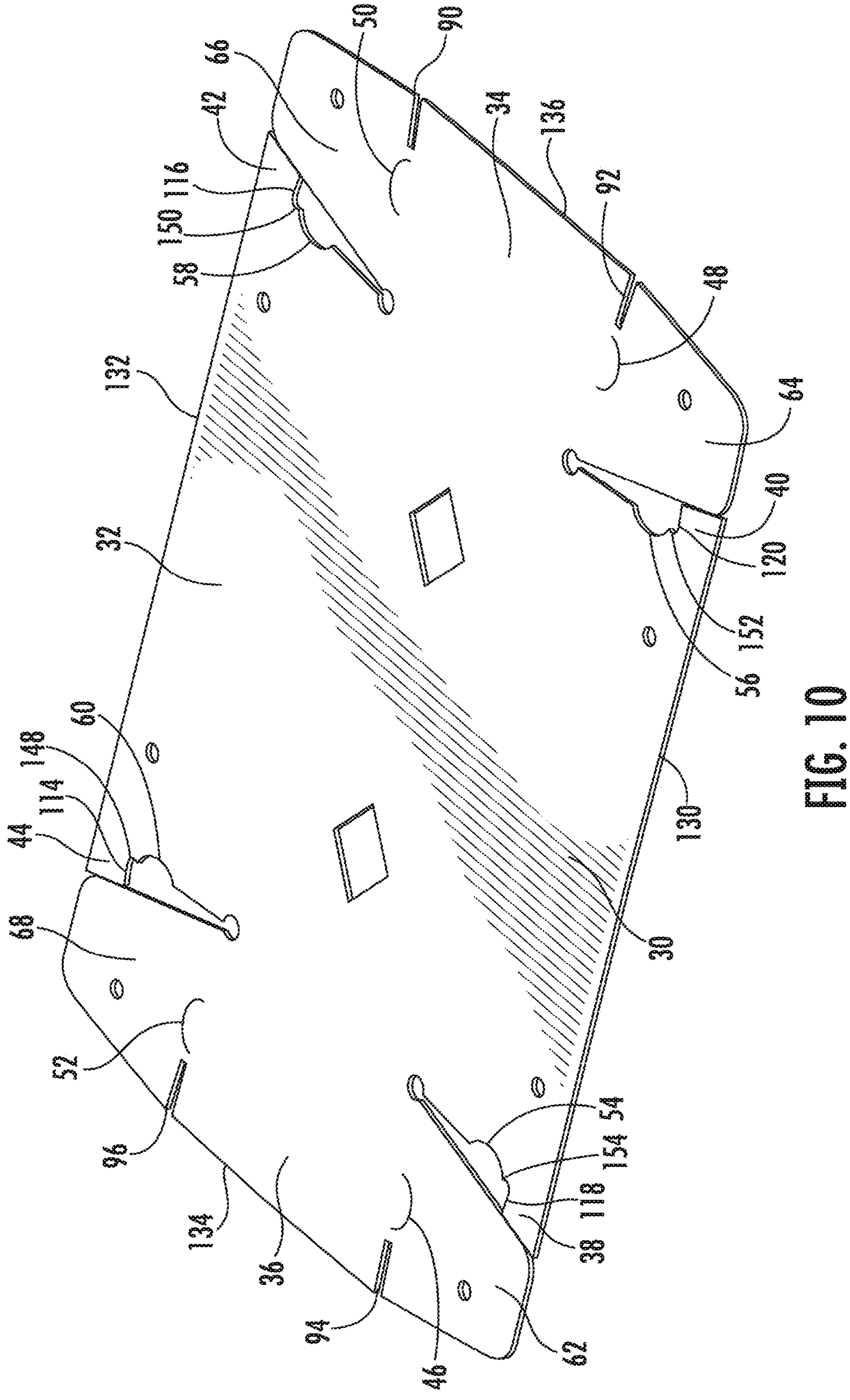

FIG. 10 is a top perspective view of a blank from which a tub lock can be made.

Figure 11:
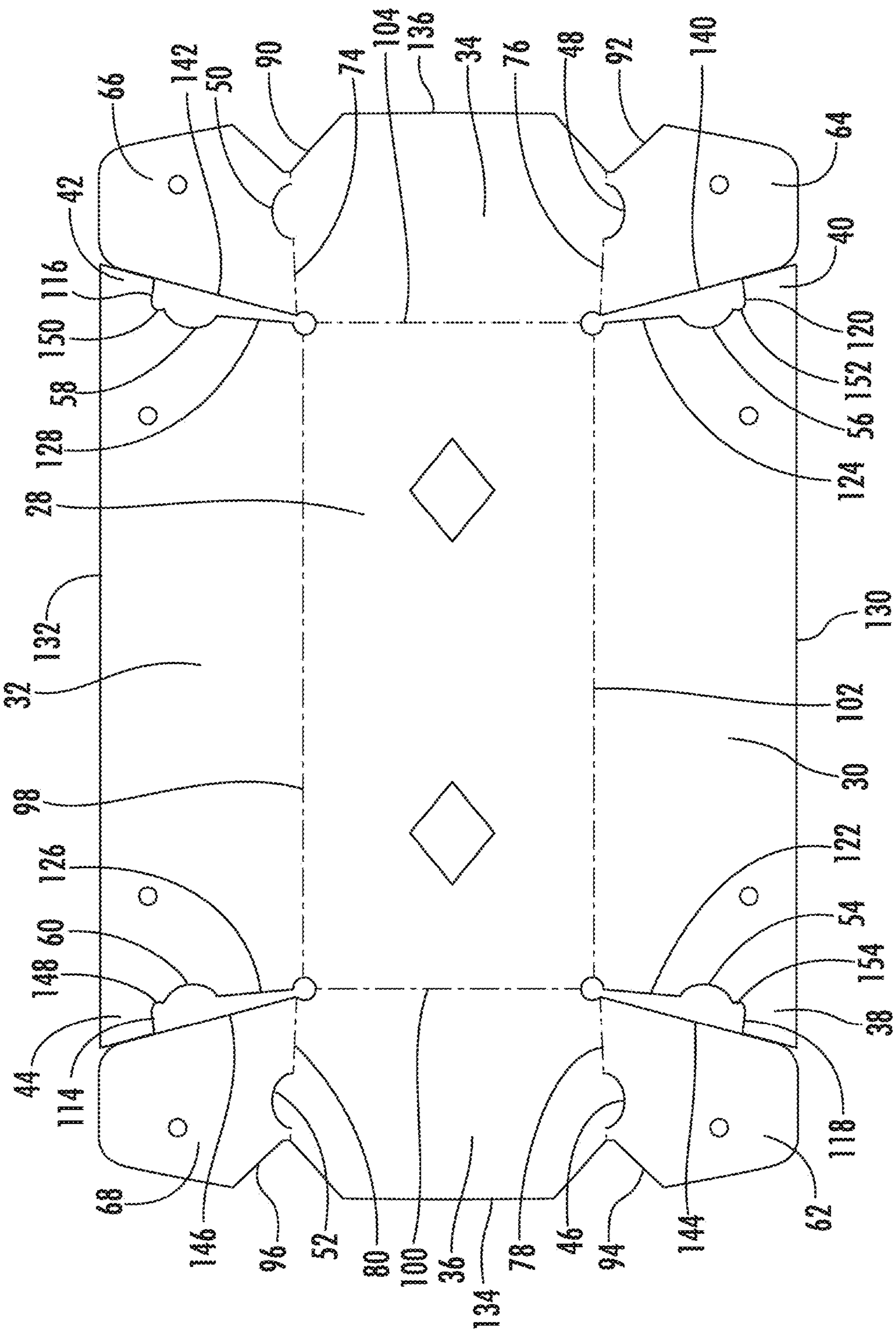

FIG. 11 is a top plan view of a blank from which a tub lock can be made.

Figure 12:
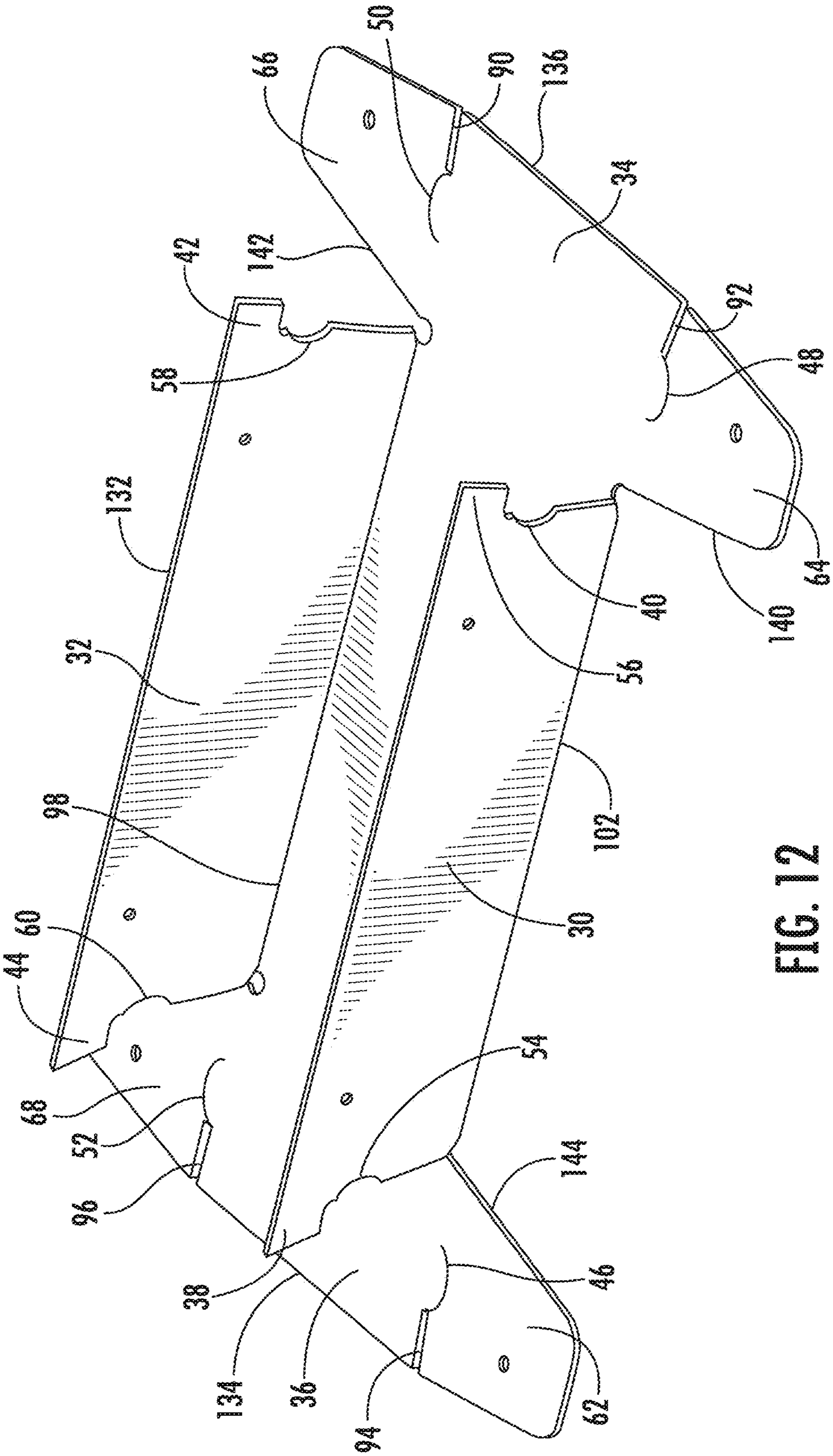

FIG. 12 is a perspective view of a tub lock with two folded side panels.

Figure 13:
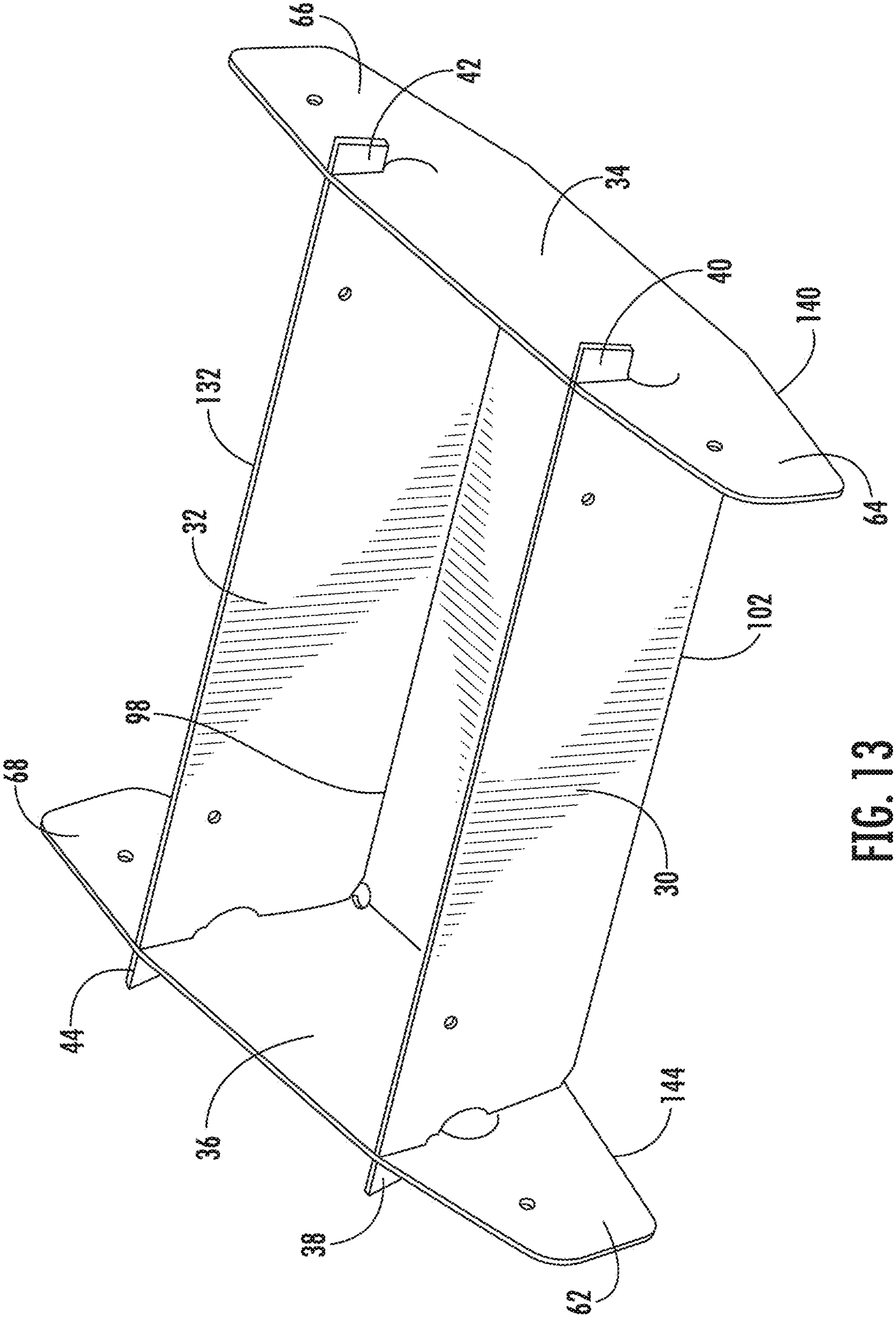

FIG. 13 is a perspective view of a tub lock with four folded side panels.

Figure 14:
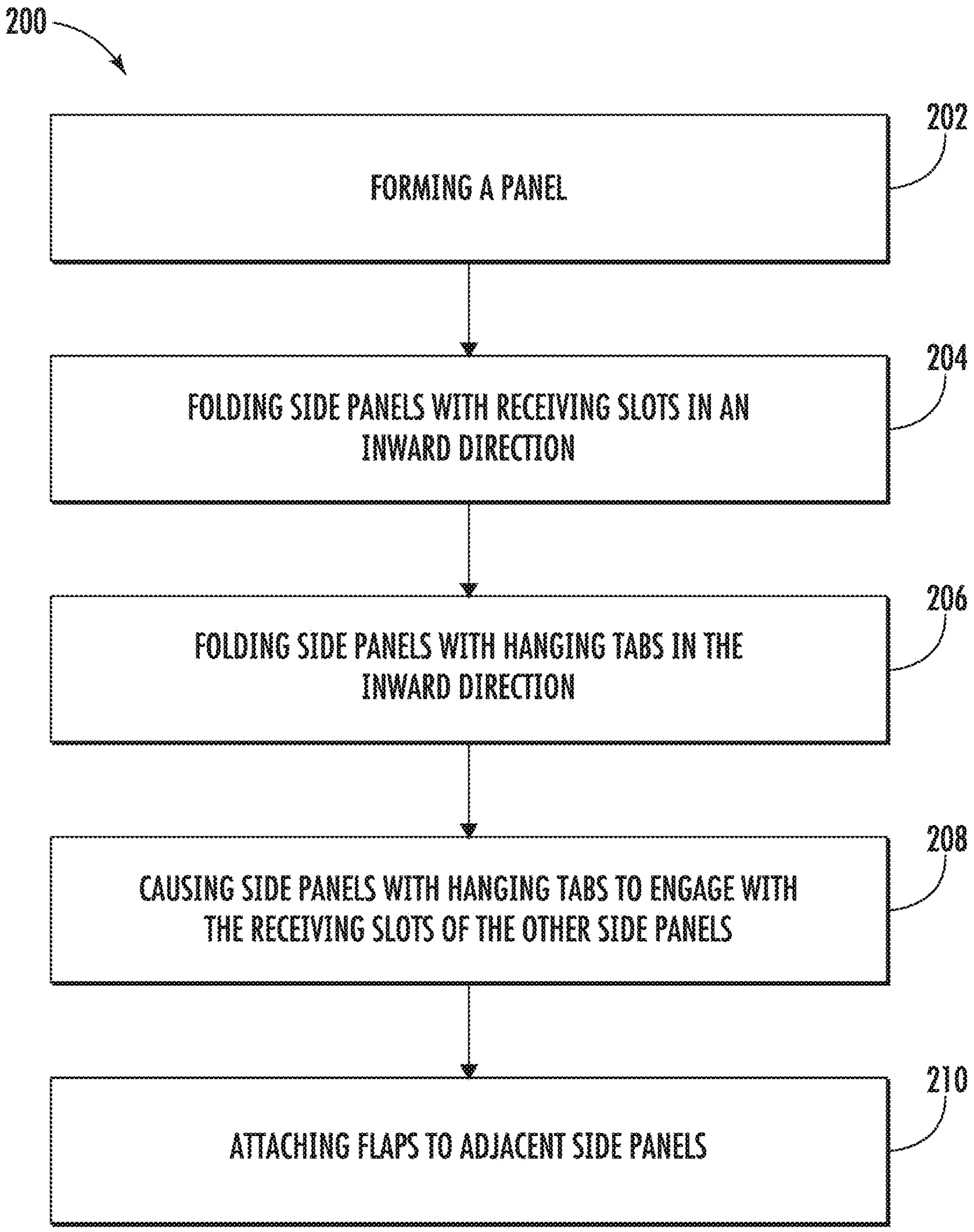

FIG. 14 is a method for making a tub lock.

DETAILED DESCRIPTION

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

Turning to the drawings, there is shown in FIG. 1 a top loading washing machine 16 containing a wash tub 12 and a washing machine cabinet 14. The washing machine itself, shown generally at 16 in FIG. 1, may in some embodiments be the type that does not have a central agitator. The wash tub 12 may have ridges 20 located on the wash tub wall interior surface and the tub 12 may move reciprocally up and down and/or rotate back and forth to agitate the clothes. In the washing machine 16 shown in FIGS. 1 and 6, the wash tub top opening 13 is slightly smaller than the cabinet top opening 15. The wash tub 12 is supported by suspension rods secured to the bottom of the tub and the inside top of the cabinet allowing it to swing from its center position and impact the walls of the cabinet 14 from the inside if not restrained. These impacts can produce a cosmetic defect to the outside of the cabinet 14.

As shown in FIGS. 6-9, this problem is solved by placing inside the washing machine 16 a tub lock 10 made according to the present invention. There is shown in FIGS. 2-5 one embodiment of the present invention, tub lock 10 for a top loading washing machine 16 that prevents the wash tub 12 from impacting (hitting) the washing machine cabinet 14 during shipping and handling. In one embodiment of the present invention, the tub lock 10 has an inverted, truncated conical shape in which the major (maximum) dimension of the bottom of the inverted cone is less than the top diameter of the wash tub top opening 13 so that the tub lock 10 fits down into the wash tub 12, and the major (maximum) dimension of the top of the inverted cone exceeds the top diameter of the wash tub top opening 13.

In one embodiment of the present invention, the major top dimension of the wash tub lock 10 contains hanging tabs 38, 40, 42, and 44 that exceed the diameter of the cabinet top opening 15. Said alternatively, the length of the wash tub lock 10, from the outer edge of hanging tab 38 to the outer edge of hanging tab 40, which are disposed on opposite ends of the longer sidewall of the wash tub lock 10, is greater than the diameter of the cabinet top opening 15. In this way, the bottom 24 of the wash tub lock 10 is located below the wash tub top opening 13 while the top 22 of the wash tub lock 10 is located above the cabinet top opening 15 (see FIG. 6).

Additionally, the sides of the wash tub lock 10 are wedged against the rim 19 of the washing machine cabinet top opening 15 and the rim 11 of the wash tub top opening 13 as shown in FIG. 6. This positioning of the wash tub lock 10 limits or even eliminates any movement of the wash tub 12 relative to the washing machine cabinet 14, thereby reducing or eliminating the possibility of the wash tub swinging against or otherwise hitting the interior wall of the washing machine cabinet 14. In some embodiments, an interference fit may be created between the wash tub lock 10 and the washing machine cabinet 14 (or the rim 19 thereof) and/or the wash tub 12 (or the rim 11 thereof).

FIGS. 2A-2C provide a perspective view of the tub lock. The tub lock 10 has a base portion 28 and at least one upwardly extending side wall. In the embodiment shown in FIGS. 2-5, the tub lock 10 has four upwardly extending side walls 30, 32, 34, and 36. In other embodiments, however, tub lock 10 may have three, five, six, or any other number of side walls. In an embodiment, side walls 30 and 32 are longer than side walls 34 and 36, such that the tub lock 10 has a rectangular configuration. However, in an alternate embodiment, the side walls may all have equivalent lengths. Side walls 30 and 32 each have outwardly extending hanging tabs 38, 40, 42, and 44 as well as elliptical cutouts 54, 56, 58, and 60. In an embodiment, hanging tabs 38, 40, 42, and 44 extend outwardly from the side walls 30 and 32 in the same plane as side walls 30 and 32. The hanging tabs 42 and 44 are disposed along the top edge of side wall 32, and they extend horizontally from opposite ends of side wall 32. Similarly, the hanging tabs 38 and 40 are disposed along the top edge of side wall 30, and they extend horizontally from opposite ends of side wall 30. Hanging tabs 38, 40, 42, and 44 each have bottom surfaces 114, 116, 118, and 120. Elliptical cutouts 54, 56, 58, and 60 are disposed within side walls 30 and 32 below hanging tabs 38, 40, 42, and 44. In one embodiment, the elliptical cutouts 54, 56, 58, and 60 are concave. The apex of each of the elliptical cutouts 54 and 56 is directed toward the center of side wall 30. Similarly, the apex of each of the elliptical cutouts 58 and 60 is directed toward the center of side wall 32.

Each of side walls 30 and 32 also has positive stops 148, 150, 152, and 154 adjacent to elliptical cutouts 54, 56, 58, and 60, as shown in FIGS. 5, 10, and 11. In one embodiment of the present invention, positive stops 148, 150, 152, and 154 each have a rounded shape, with the apex of the curve pointing towards the center of side wall 30 or 32, respectively. The positive stops 148, 150, 152, and 154 are adjacent to the bottom surfaces 114, 116, 118, and 120 of hanging tabs 38, 40, 42, and 44. As shown in FIGS. 2A-2C, the bottom surfaces 114, 116, 118, and 120 of hanging tabs 38, 40, 42, and 44 fit within the respective receiving slots 90, 92, 94, and 98, and the positive stops 148, 150, 152, and 154 rest against the inner sides of side walls 34 or 36, respectively.

Referring again to FIGS. 2A-2C, side walls 34 and 36 (in some embodiments, the shorter side walls in a rectangular configuration) each have receiving slots 90, 92, 94, and 96, which are configured to receive side walls 30 and 32. More particularly, receiving slots 90, 92, 94, and 96 are configured to receive the bottom surfaces 114, 116, 118, and 120 of hanging tabs 38, 40, 42, and 44. Receiving slots 90, 92, 94, and 96 may optionally be shaped as slits, such as in FIGS. 2A and 3A. Alternatively, receiving slots 90, 92, 94, and 96 may be V-shaped, such as in FIGS. 2B, 2C, and 3B. Receiving slots 90, 92, 94, and 96 may also be U-shaped, C-shaped, or any other suitable shape.

Side walls 34 and 36 also have flaps 62, 64, 66, and 68 and elliptical tabs 46, 48, 50, and 52. The flaps 62, 64, 66, and 68 are configured to bend at side edges 74, 76, 78, and 80 and are attachable to side walls 30 and 32, for example, using hot melt adhesive. Other methods of attachment, including the use of any adhesive known in the art, are also contemplated, however. The elliptical tabs 46, 48, 50, and 52 are bendable or deformable in a radial direction R (see FIG. 2A) to fit into the elliptical cutouts 54, 56, 58, and 60 when the tub lock 10 is fitted into the washing machine 16. When the tub lock 10 is fitted into the washing machine 16, the elliptical tabs 46, 48, 50, and 52 bend or deform to cover the rough, cut edges of the elliptical cutouts 54, 56, 58, and 60, thereby protecting the edge of the washing machine cabinet 14 from becoming scratched or otherwise damaged when the tub lock 10 is in place. Without such elliptical tabs, the rough, cut edges of the elliptical cutouts have a tendency to rub the rim of the washing machine frame and creates scratches and general wear and tear during transit and installation.

The four-sided (rectangular) shape of the tub lock 10 is considered optimal because of its ease of assembly and efficient use of materials. However, other tub lock shapes are contemplated, including three, five and seven sided truncated cones.

In at least one embodiment, tub lock 10 is made out of a corrugated fiberboard material, although other tub lock materials are contemplated. In an embodiment, the tub lock 10 is paper-based. In an embodiment, the tub lock 10 comprises 100% paper-based materials. The inventive tub lock 10, in an embodiment, is prevented from falling into wash tub 12 even in hot and/or humid climates, in which a paper-based material such as corrugated cardboard may soften and move out of position.

Referring now to FIGS. 10-11, the tub lock 10 is formed from a unitary (one piece) blank that is cut and folded into a three-dimensional shape that fits into the tub top section. In one embodiment of the present invention, the blank may be made of corrugated cardboard. However, in other embodiments of the present invention, the blank may be made of any other suitable material. In this example embodiment, the blank comprises four substantially rectangular flat side panels 30, 32, 34, and 36. As shown in FIG. 11, side panels 30 and 32 each have two side edges 122, 124, 126, and 128 and an outer edge 130, 132.

As shown in FIG. 11, the side edges 122, 124, 126, and 128 of side panels 30 and 32 may be slanted at an angle of approximately 60 degrees from fold lines 98 and 102, respectively. The side edges 122, 124, 126, and 128 each define elliptical cutouts 54, 56, 58, and 60. The elliptical cutouts 54, 56, 58, and 60 may be shaped as partial or half ellipses, as partial or half circles, or as any other shape or design. The elliptical cutouts 54, 56, 58, and 60 are configured to correspond to the shape of the rim 19 of the cabinet 14 when the tub lock 10 is constructed and disposed within washing machine 16. The side edges 122, 124, 126, and 128 each additionally define hanging tabs 38, 40, 42, and 44. The hanging tabs 38, 40, 42, and 44 extend outwardly along the outer edges 132 and 134 of side panels 30 and 32 in a direction that is parallel to fold lines 98 and 102. The hanging tabs 38, 40, 42, and 44 are generally rectangular in shape, but in other embodiments, the hanging tabs 38, 40, 42, and 44 may be any other suitable shape. Side edges 122, 124, 126, and 128 each also define positive stops 148, 150, 152, and 154, which are positioned between elliptical cutouts 54, 56, 58, and 60 and the bottom surfaces 114, 116, 118, and 120 of hanging tabs 38, 40, 42, and 44. In some embodiments, the positive stops 148, 150, 152, and 154 have a curved shape. The apex of each curve of each of the positive stops 148, 150, 152, and 154 points toward the center of side panel 30 or 32, respectively. It is noted that the side edges 122, 124, 126, and 128 may be slanted at any other angle, and the elliptical cutouts 54, 56, 58, and 60 and the hanging tabs 38, 40, 42, and 44 may take on any other shape.

In an embodiment, bottom edges 140, 142, 144, and 146 of the flaps 62, 64, 66, and 68 are slanted at an angle of approximately 30 degrees from fold lines 100 and 104. Outer edges 134 and 136 of side walls 34 and 36 define receiving slots 90, 92, 94, and 96. The receiving slots 90, 92, 94, and 96 may be V-shaped, U-shaped, or C-shaped, or the receiving slots 90, 92, 94, and 96 may be in the shape of slits. Alternatively, receiving slots 90, 92, 94, and 96 may have any other shape that is suitable for receiving the bottom surfaces 114, 116, 118, and 120 of hanging tabs 38, 40, 42, and 44 when the blank is folded to form tub lock 10. Side panels 34 and 36 also include elliptical tabs 46, 48, 50, and 52, which may be formed by scoring the blank. The elliptical tabs 46, 48, 50, and 52 are located inwardly from receiving slots 90, 92, 94, and 96. In an embodiment, elliptical tabs 46, 48, 50, and 52 are not connected to, or are slightly separated from, receiving slots 90, 92, 94, and 96. It is noted that the bottom edges 140, 142, 144, and 146 of the flaps 62, 64, 66, and 68 may be slanted at any other angle, and the receiving slots 90, 92, 94, and 96 may take on any other shape.

As shown in FIGS. 2A-2C and 12-13, the blank can be folded at fold lines 98, 100, 102, and 104. The side panels 30, 32, 34, and 36 can then be interlocked to form a truncated rectangular cone shaped tub lock. Specifically, the bottom surfaces 114, 116, 118, and 120 of hanging tabs 38, 40, 42, and 44 may be received by and interlocked with receiving slots 90, 92, 94, and 96 after folding. Additionally, when the blank is in a folded position, the positive stops 148, 150, 152, and 154 may rest against the inside walls of side panels 34 and 36, respectively. The side panels 30, 32, 34, and 36 need not be uniform in shape or dimensions. In addition to the interlocking assembly method, the tub lock 10 may also be assembled using hot melt adhesive, glue, or any other adhesive or fasteners. For example, hot melt adhesive, glue, staples or any other adhesive may be used to attach flaps 62, 64, 66, and 68 of side panels 34 and 36 to side panels 30 and 32 after folding. Alternatively, any suitable mean of attaching the panels may be used.

FIG. 14 illustrates an example method 200 of making tub lock 10. The method 200 may include forming a panel (or blank) at operation 202. The panel (or blank) may be configured as described above in reference to FIGS. 10-11. The method 200 may further include folding the side panels with receiving slots in an inward direction at operation 204. The method 200 may further include folding the side panels with hanging tabs in the inward direction at operation 206. The method 200 may then include causing the side panels to engage with the receiving slots on the other side panels at operation 208, such that the side walls are interlocked with each other. Finally, the method 200 may include attaching the flaps to the adjacent side panels at operation 210, such that the tub lock 10 is in a constructed position. In its constructed configuration, elliptical tabs 46, 48, 50, and 52 extend outwardly from side panels 34 and 36 such that the faces of elliptical tabs 46, 48, 50, and 52 are parallel with fold lines 100 and 104. When the tub lock 10 is placed within the washing machine 16, the elliptical tabs 46, 48, 50, and 52 bend or deform radially into elliptical cutouts 54, 56, 58, and 60 such that the faces of elliptical tabs 46, 48, 50, and 52 are no longer parallel with fold lines 100 and 104. Instead, when the tub lock 10 is positioned within the washing machine 16, the faces of elliptical tabs 46, 48, 50, and 52 are in contact with the rim 19 of the cabinet 14.

In some embodiments of the present invention, the tub lock 10 comprises a base portion 28 as shown in FIG. 2A to help the tub lock 10 retain its shape during use. If the washing machine has a central agitator, the tub lock 10 must be shallow enough to fit above the agitator or not have a base portion 28. Alternatively, base portion 28 may include a circular hole to allow for the central agitator to fit through the base portion 28. The hole may be circular or any other shape.

If necessary, notches may be formed in the top 22 of the tub lock 10 to accommodate the washing machine lid hinge or other lid components.

The invention works in the following manner. As shown in FIG. 6, the constructed tub lock 10 is inserted into the top section of the wash tub 12 so that it is wedged against the washing machine opening and/or wash tub opening. In this way, the tub lock 10 is interlocked with the washing machine 16. It should be appreciated that the tub lock 10 may also be positioned within, disposed within, or secured within the washing machine 16. If a four-sided tub lock 10 is used, it may contact the washing machine cabinet 14 and/or wash tub 12 in four places. Additionally, in some embodiments, a lower portion of the tub lock 10 may contact the interior of the wash tub 12 when the tub lock 10 is placed in the washing machine 16. When the tub lock 10 is wedged against the washing machine cabinet 14 and/or wash tub 12, the elliptical tabs 46, 48, 50, and 52 bend or deform in the radial direction R to cover the elliptical cutouts 54, 56, 58, and 60. In this way, a face of each elliptical tab contacts the rim 19 of the cabinet 14 and thus protects the cabinet 14 from scratching or other wear that might result if the edges of the elliptical cutouts were allowed to contact the cabinet 14. Additionally, when the tub lock 10 is wedged against the washing machine cabinet 14 and/or wash tub 12, the hanging tabs 38, 40, 42, and 44 rest on top of the rim 19 of the cabinet 14 to further prevent the tub lock 10 from falling into the wash tub 12. The tub lock 10 is removed once the washing machine 16 reaches its final destination.

Thus, there has been described a tub lock for a washing machine that protects the washing machine cabinet from being damaged or dented from the inside by the washing machine tub. In some example embodiments, the tub lock is made from a folded and interlocked corrugated fiberboard blank to provide strength and recyclability. The tub lock can be used with a washing machine to further protect and cushion the washing machine during assembly and shipping.

The present invention can also be used with dryers having a dryer tub mounted within a cabinet in a fashion similar to that of the washing machines described herein.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A tub lock device for a washing machine, the tub lock device comprising:

a base;

at least two side walls extending upwardly from the base, the side walls each having a top edge opposite the base;

at least one hanging tab disposed along the top edge of each of the at least two side walls and extending outwardly from each of the least two side walls in the same plane as the at respective side wall;

at least one cutout disposed in each of the at least two side walls; and at least one additional tab extending through each of the at least one cutout in each of the at least two side walls;

wherein the at least one hanging tab is disposed above each of the at least one additional tab; and wherein when the tub lock device is disposed within a washing machine having a wash tub and a cabinet, the at least one hanging tab is in contact with a rim of the cabinet to prevent the device from falling into the wash tub.

2. The tub lock device of claim 1, wherein the tub lock device comprises corrugated cardboard.

3. The tub lock device of claim 1 comprising a fold between the base and each of the at least two side walls.

4. The tub lock device of claim 1 wherein each of the at least one cutout is sized and configured to receive one of the at least one additional tabs.

5. The tub lock device of claim 1 wherein each of the at least one additional tab is disposed on a panel.

6. The tub lock device of claim 5 wherein each of the at least one additional tab extends from the panel in a direction parallel with the panel from which it extends.

7. The tub lock device of claim 5 comprising a plurality of panels and wherein each of the plurality of panels is folded perpendicular to the base.

8. The tub lock device of claim 7 wherein upon folding, each of the at least one additional tab is disposed within one of the at least one cutouts.

9. The tub lock device of claim 1, wherein the tub lock device comprises four hanging tabs.

10. The tub lock device of claim 9, wherein the at least four hanging tabs are disposed at opposite ends of the top edge of each of the at least two side walls.

11. A method of using the tub lock device of claim 1, comprising:

inserting the tub lock device into a top opening of the wash tub such that the base passes through the top opening; and positioning the tub lock device such that the at least one hanging tab rests on a top of the rim of the cabinet of the washing machine.

* * * * *